US011704094B2

(12) United States Patent
Guisado et al.

(10) Patent No.: US 11,704,094 B2
(45) Date of Patent: Jul. 18, 2023

(54) DATA INTEGRITY ANALYSIS TOOL

(71) Applicant: SAP SE, Walldorf (DE)

(72) Inventors: Victor Silva Guisado, Heidelberg (DE); Kirsten Boennen, Bad Schoenborn (DE); Rolf Eiling, Heidelberg (DE)

(73) Assignee: SAP SE, Walldorf (DE)

( * ) Notice: Subject to any disclaimer, the term of this patent is extended or adjusted under 35 U.S.C. 154(b) by 532 days.

(21) Appl. No.: 16/501,486

(22) Filed: Nov. 18, 2019

(65) Prior Publication Data

US 2021/0149639 A1    May 20, 2021

(51) Int. Cl.
*G06F 8/30* (2018.01)
*G06F 16/215* (2019.01)
*G06F 16/34* (2019.01)
*G06F 8/10* (2018.01)

(52) U.S. Cl.
CPC ............. *G06F 8/30* (2013.01); *G06F 8/10* (2013.01); *G06F 16/215* (2019.01); *G06F 16/345* (2019.01)

(58) Field of Classification Search
CPC . G06F 8/10; G06F 8/30; G06F 16/215; G06F 16/345
See application file for complete search history.

(56) References Cited

U.S. PATENT DOCUMENTS

| | | | | |
|---|---|---|---|---|
| 6,014,424 | A * | 1/2000 | Thai | H04M 3/242 379/27.04 |
| 6,355,423 | B1 * | 3/2002 | Rothberg | G16B 25/10 435/6.16 |
| 7,571,151 | B1 * | 8/2009 | Fontaine | G06F 16/258 |
| 7,680,830 | B1 | 3/2010 | Ohr et al. | |
| 8,180,742 | B2 | 5/2012 | Claudatos et al. | |
| 8,209,661 | B2 * | 6/2012 | Smialek | G06F 8/30 715/219 |
| 8,352,535 | B2 | 1/2013 | Peled et al. | |
| 9,047,228 | B2 | 6/2015 | Sarferaz et al. | |

(Continued)

OTHER PUBLICATIONS

Haeusser, B. et al., "ILM Library: Information Lifecycle Management Best Practices Guide," International Technical Support Organization, Jan. 2007, 326 pages.

*Primary Examiner* — S. Sough
*Assistant Examiner* — Zheng Wei
(74) *Attorney, Agent, or Firm* — Mintz Levin Cohn Ferris Glovsky and Popeo, P.C.

(57) ABSTRACT

A system for verifying data integrity in a database may include accessing a first file with a management object. The management object corresponds to a set of database tables located in a database. The system loads a data extract file including the management object, the data extract file containing fields related to content associated with the management object. The system accesses a second file with a condition, the condition being indicative of the content associated with the management object. The system generates code to evaluate the management object in the data extract file. The system evaluates the content associated with the management object in the data extract file using the generated code. The system identifies an entry in the data extract file that does not meet the condition, the entry representative of content associated with the management object, and then presents the entry to a user.

16 Claims, 9 Drawing Sheets

(56) References Cited

U.S. PATENT DOCUMENTS

| | | | |
|---|---|---|---|
| 9,477,842 B2 | 10/2016 | Ravindran | |
| 9,734,169 B2 | 8/2017 | Redlich et al. | |
| 10,423,416 B2 * | 9/2019 | Hao | G06F 8/36 |
| 2005/0066240 A1 * | 3/2005 | Sykes | G06Q 10/10 |
| | | | 714/48 |
| 2007/0174245 A1 * | 7/2007 | Folting | G06F 16/26 |
| 2010/0228764 A1 * | 9/2010 | Sallakonda | G06F 16/24565 |
| | | | 707/769 |
| 2012/0215749 A1 | 8/2012 | Van Beneden et al. | |
| 2013/0268917 A1 * | 10/2013 | Chandrasekharan | G06F 8/30 |
| | | | 717/124 |
| 2014/0007056 A1 * | 1/2014 | Leizerovich | G06F 16/273 |
| | | | 717/124 |
| 2014/0082753 A1 | 3/2014 | Sarferaz | |
| 2016/0253404 A1 | 9/2016 | Fabijancic | |
| 2017/0286474 A1 * | 10/2017 | Sramka | G06F 16/9024 |
| 2017/0315905 A1 * | 11/2017 | Choudhury | G06F 11/36 |
| 2018/0032554 A1 * | 2/2018 | Widjanarko | G06F 16/212 |
| 2018/0089252 A1 * | 3/2018 | Long | G06F 16/215 |

* cited by examiner

| Description | ILM Object | Tables and Clusters | To the details | Few entries | Data in the future | Contains suspicious data | Old data |
|---|---|---|---|---|---|---|---|
| Additional Personal Identity Group | HRP99APID | PA0182;PA0185; | HRP99APID | X | - | - | - |
| HR: Addresses | HRPA_ADRGR | PA0006;PA0801;PA3365; PA3366;PA3399; | HRPA_ADRGR | X | - | - | - |
| HR: Address | HRPA_ADRS | PA0006; | HRPA_ADRS | X | - | - | - |
| HR: Communication | HRPA_CMNGR | PA0105; | HRPA_CMNGR | X | - | - | - |
| HR: Zeiterfassungsinformation | HRTIM_REC | PA0050;PCL1; | HRTIM_REC | X | - | - | X |
| Travel Management Privileges (Infotype 0017) | HRTV_PRVLG | PA0017; | HRTV_PRVLG | - | - | - | - |
| HR: Tax Card Information CZ | HRCATSOCI | PA0044;PA0056;PA0367; PA0751; | HRCATSOCI | X | - | - | X |
| Danish Payroll Information | Custom infotype 9001 | PA9001 | Custom infotype 9001 | X | - | - | - |
| HR Administrative Services: Employee Processes | HRASR_PA | POBJD_LEVEL;POBJD_OBJECTS;SCMGPREL_CLNT; SCMG_T_CASE;SCMG_T_CASE_ATTR;TSASRCONTCASELNK;TSASRDOCCASELNK;TSASRDOCUMENTS;TSASRPROCESSES;TSASRSCENARIOS;TSASRSTEPDETAILS;TSASRSTEPS; | HRASR_PA | X | - | - | X |
| HR Admin. Services: Organisatorische Prozesse | HRASR_PD | POBJD_LEVEL;POBJD_OBJECTS;SCMGPREL_CLNT; SCMG_T_CASE;SCMG_T_CASE_ATTR;TSASRCONTCASELNK;TSASRDOCCASELNK;TSASRDOCUMENTS;TSASRPROCESSES;TSASRSCENARIOS;TSASRSTEPDETAILS;TSASRSTEPS; | HRASR_PD | X | - | X | X |
| Additional Personal Identity Data | HRC99APID | PA0182;PA0185; | HRC99APID | X | - | - | - |
| HR: Communication | HRPA_CMNTN | PA0105; | HRPA_CMNTN | X | - | - | - |
| HR: Cost Distribution | HRPA_COSTD | PA0027;PCL1; | HRPA_COSTD | X | - | - | - |
| HR: Corporate Function | HRPA_CRPFC | PA0034;PCL1; | HRPA_CRPFC | X | X | - | - |
| HR: Contract Elements | HRPA_CTRCT | PA0016;PCL1; | HRPA_CTRCT | - | - | X | - |
| HR: Family/Related Person | HRPA_FMLYM | PA0021; | HRPA_FMLYM | X | - | - | - |
| HR: Internal Data | HRPA_INDAT | PA0032;PCL1; | HRPA_INDAT | X | - | X | - |
| HR: Company Instructions | HRPA_INSTR | PA0035;PCL1; | HRPA_INSTR | - | - | X | - |
| HR: Notifications | HRPA_NTFTN | PA0128;STXH;STXL; | HRPA_NTFTN | X | - | - | X |

DATA INTEGRITY ANALYSIS TOOL

TECHNICAL FIELD

The subject matter described herein relates generally to database processing tools and, more specifically, to managing data stored in a database.

BACKGROUND

The integrity of a database is compromised with incomplete or inaccurate information. Data integrity over the entire database life-cycle is critical for the implementation and the usage of the database. Data stored in the database may need to be split between two different databases or combined with another database. A database may require various clean-up activities to effectively manage the database. Data migration between systems requires that the incoming data be compliant with the new system. Data migration from an older system to a newer system may require that older, irrelevant data is purged or deleted before migration to the new system to prevent inefficiencies.

SUMMARY

Systems, methods, and articles of manufacture, including computer program items, are provided for a data integrity analysis tool. In one aspect, a system includes at least one data processor and at least one memory. The at least one memory stores instructions that cause operations when executed by the at least one data processor. The operations include accessing a first file with a management object, the management object corresponding to a set of database tables located in a database; loading a data extract file including the management object, the data extract file containing fields in text form related to content associated with the management object; accessing a second file with a condition, the condition being indicative of the content associated with the management object; generating, based on the management object in the first file and the condition from the second file, code to evaluate the management object in the data extract file; evaluating the content associated with the management object in the data extract file using the generated code; identifying an entry in the data extract file that does not meet the condition, the entry representative of content associated with the management object; and presenting the entry to a user.

In some variations, one or more features disclosed herein including the following features can optionally be included in any feasible combination. In some variations, the management object in the first file includes a technical description.

In some variations, the generating code to evaluate the management object in the data extract file further comprises using the technical description corresponding to the management object in the first file.

In some variations, the technical description includes a name of the management object and an address of the set of database tables.

In some variations, the content associated with the management object includes information stored in corresponding sets of database tables.

In some variations, the condition is a logical condition resulting in a Boolean expression.

In some variations, the fields of the data extract file are determined by the content associated with the management object.

In some variations, generating code to evaluate the management object in the data extract file further comprises using a wild character, the wild character indicating an additional management object in the data extract file is to be evaluated by the condition.

In some variations, the first file is a plain text file and the data extract file is a plain text file.

In some variations, the entry is presented in one of an excel file, a word file, a pdf, and a plain text file.

In some variations, the system further comprises generating the data extract file based on the management object in the first file.

In some variations, the system further comprises populating the fields of the data extract file using the set of database tables corresponding to the management object of the data extract file.

In some variations, the generating code to evaluate the management object in the data extract file further comprises using, to generate the code, the fields, the condition, and a value associated with the management object.

In some variations, the system further comprises generating summary report comprising the entry and highlighting a record that does not meet the condition.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to internal tables for accessing data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts a summary report display, in accordance with some example embodiments;

When practical, similar reference numbers denote similar structures, features, or elements.

DETAILED DESCRIPTION

Data stored in a database may be organized into one or more database objects. Data stored in the database may need to be split between two different databases or combined with another database. Data in the database may require various clean-up activities to effectively manage the database. Data migration between systems requires that the incoming data be compliant with the new system. Data migration from an older system to a newer system may require that older, irrelevant data is purged or deleted before migration to the new system to prevent inefficiencies.

Irrelevant or unnecessary information may need to be discarded to maintain the integrity of the database system. Database systems often have a vast amount of information, resulting in difficulties sorting through the data to determine whether the information is to be discarded. Further difficulties arise in older systems due to the number of modules and cross-referencing between database tables. Thus, reliable and efficient systems and methods for information lifecycle management are needed.

Implementations of the current subject matter include functionality that may be referred to as a data integrity tool. Approaches consistent with such a tool may provide benefits, for example, by reducing the possibility of messy and poor data migration between servers. Such a data integrity tool may detect erroneous records on a cloud service provider to improve the efficiency and load on its database. The data integrity tool may be used to identify inconsistencies that may occur from a system merge or split. The data integrity tool or may potentially identify the misuse of data objects Another possible use of a data integrity tool consistent with the current disclosure is to identify those data records that are ready for deletion. A given data record may be considered ready for deletion if the data record does not meet a defined set of criteria. Data records that are deletion ready can be deleted under the direction of a database management tool. Data records that are not deletion ready cannot be deleted by the database management tool 150.

Systems and methods consistent with the current disclosure may relate to verifying the integrity of data in a database. A system may access a first file with a management object. The management object corresponds to a set of database tables located in a database. The system loads a data extract file including the management object, the data extract file containing fields related to content associated with the management object. The system accesses a second file with a condition, the condition being indicative of the content associated with the management object. The system generates code to evaluate the management object in the data extract file. The system evaluates the content associated with the management object in the data extract file using the generated code. The system identifies an entry in the data extract file that does not meet the condition, the entry representative of content associated with the management object, and then presents the entry to a user.

Figure 1:
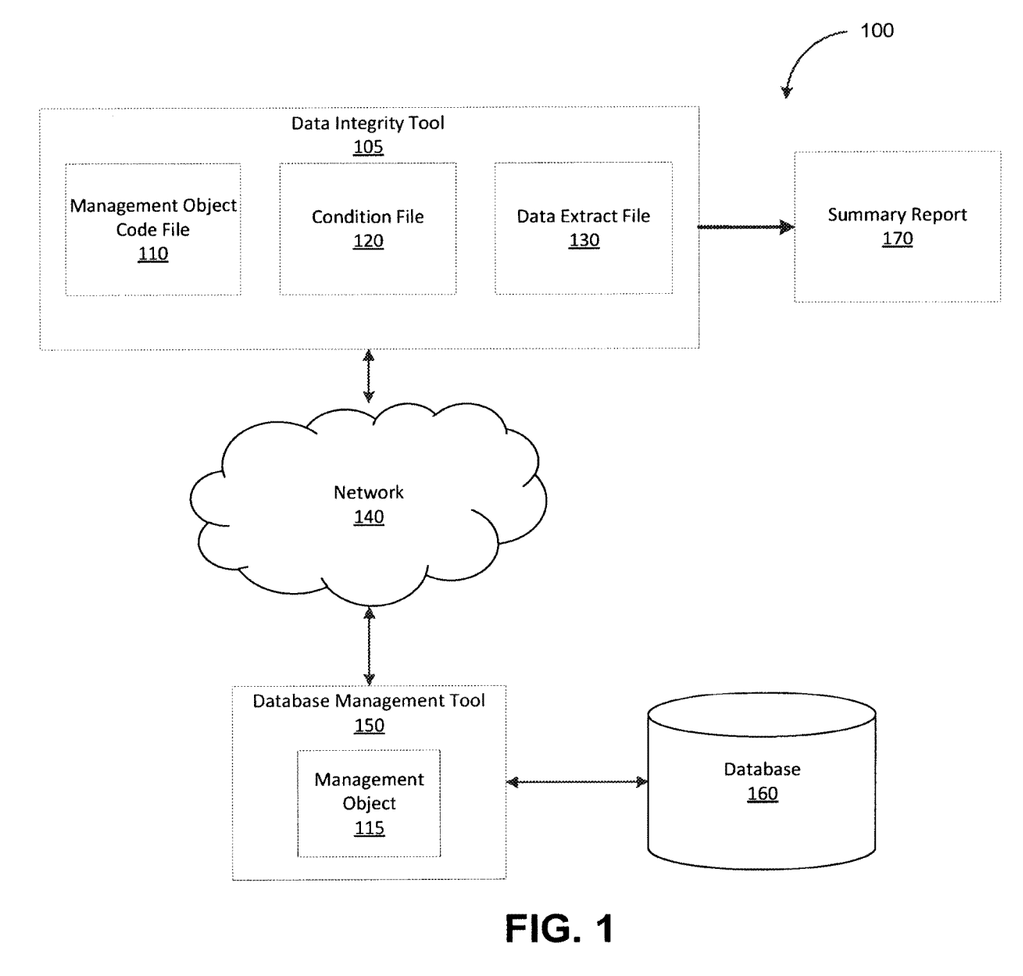
FIG. 1 depicts a block diagram illustrating a data integrity tool, in accordance with some example embodiments.

FIG. 1 depicts a block diagram illustrating a data integrity tool 105, in accordance with some example embodiments. The data integrity tool system 100 includes a data integrity tool 105, a network 140, a database management tool 150, and a database 160. The data integrity tool 105 may include a management object file 110, a condition file 120, and a data extract file 130. The data integrity tool 105 may be configured to generate a summary report 170. The data integrity tool 105 may be communicatively coupled to a network 140. The network 140 may be communicatively coupled to a database management tool 150. The database management tool 150 may include a management object 115. The database management tool 150 may be communicatively coupled to a database 160.

Data integrity tool 105 is configured to extract data of the content associated with the management object 115 with a management object file 110 and a condition file 120. The data integrity tool 105 is configured to search and identify the content associated with the management object 115. The extracted data may be saved locally as a plain text file as the data extract file 130.

The data integrity tool 105 may be configured to use a management object file 110 to read the data stored in a set of database tables corresponding to the management object 115. The data read by the data integrity tool 105 from the database tables may be stored in the data extract file 130 or may be used to populate the data extract file 130. In at least one embodiment, the data integrity tool 105 populates the fields of the data extract file 130 using the set of database tables corresponding to the management object 115 of the data extract file 130. The management object file 110 and the condition file 120 may direct the data integrity tool 105 to generate the data extract file 130 according to the management object 115 and its corresponding set of database tables.

In some embodiments, the data integrity tool 105 utilizes a technical description of the management object 115 found in the management object file 110. The technical description may include a definition of the relevant set of database tables of the management object 115. The technical description may include an address of the relevant set of database tables of the management object 115. In at least one embodiment, the data integrity tool 105 reads the information from the management object file 110 and the condition file 120 to dynamically generate the evaluation code that is executed during the evaluation of content related to each management object 115. The evaluation code may be used to determine whether the content associated with the management object 115 meets a condition. In generating code (i.e., the evaluation code) to evaluate the management object 115 in the data extract file 130, the data integrity tool 105 may use the technical description corresponding to the management object in the first file.

The data integrity tool 105 may refer to the data extract file 130 to identify management objects that should be checked. The data extract file 130 may point the data integrity tool 105 to the management object file 110 or provide the data integrity tool 105 with sufficient information to identify the management object 115 in the database management tool 150. The data integrity tool 105 may search and identify the content associated with the data integrity tool 105. The data integrity tool 105 may identify the content and records that do not match the conditions and store the content and records in the data extract file 130. In some embodiments, the management object 115 is deleted by the data integrity tool 105 if its associated content does not meet the conditions.

The data integrity tool 105 may generate a summary report 170 which includes listing the management object 115. The summary report 170 indicates whether the management object 115 meets a condition. The summary report 170 identifies content associated with a management object 115 that fails to meet the condition. The content failing to meet the condition may be an entry in the summary report 170. The summary report may highlight the entry. The summary report 170 may also provide a detailed view of any additional conditions that the management object 115 fails to meet. The summary report 170 is configured to be presented to a user.

The data integrity tool 105 may include a user interface. The parameters entered through the user interface may control the data integrity tool 105. The user interface may designate the management object file 110, the condition file 120, and the data extract file 130 to be used. The user interface may indicate a text file that represents the management object file 110, the condition file 120, and the data extract file 130. The user interface may indicate a folder in which the data extract file 130 will be created. The user interface may present a set of tabs corresponding to the management object 115 in the data extract file 130 for a user to select conditions. The user interface may present an overview through which the details of each management object 115 are presented. The user interface may provide a link, hyperlink, address, reference, or pointer to the management object file 110. The user interface may provide a folder where the data extract file 130 is currently located or where it is to be located. The user interface may provide a link, hyperlink, address, reference or pointer to the data extract file 130. The user interface may provide a link, hyperlink, address, reference, or pointer to the condition file 120 that includes statements for evaluating the data records and content for the management object 115. The user interface may designate the file format of the summary report 170 of the data integrity tool 105. In at least one embodiment, the file format of the summary report is one of an Excel file, a Word file, a document, a pdf, or a plain text file.

The management object file 110 may include a technical description for a management object 115. In at least one implementation, the technical description may include the name of the management object 115 and a set of database tables corresponding to the management object 115. The management object file 110 may include code used for generating the evaluation code to determine whether the content of a management object 115 meets a condition. Management object file 110 may include a set of database tables associated with the management object 115. The set of database tables may be accessible using the database management tool 150 using the code or the technical description of the management object file 110. In at least one embodiment, the grammar defining the management object structure may include the name of the management object 115 and a description of the management object. Wild characters may be used in the grammar defining the code or technical description in the management object file 110. The management object 115 may be grouped according to management object rules and then put together in the data extract file 130 by the data integrity tool 105. The management object file 110 may be a plain text file.

The database management tool 150 may include a management object 115. The management object 115 may include corresponding content or data records in the database 160. The management object 115 may include a set of database tables located in a database. The management object 115 may be a set of logical objects that work together as a single piece of information in a business process. The information related to the management object 115 can be stored in a set of database tables in the database 160. The management object 115 may be represented as code and stored in a plain text file as the management object file 110. The number of database tables corresponding to a given management object 115 may tend to increase over time. In some embodiments, an older database may have more associated management objects than a newer database. The number of management objects 115 may tend to increase with the number of modules installed and in use in the same system. The management object 115 may be used for data destruction in the database 160. The management object 115 may be used to delete data from the database 160 without compromising the database functionality or integrity.

The condition file 120 includes code representative of a condition to be applied to the content associated with the management object 115. A condition may have a broad scope or a narrow scope. A condition with a broad scope may apply to more than one management object 115. In an exemplary embodiment, the condition may be field year cannot be empty. A condition with a narrow scope only applies to one management object 115. In an at least one embodiment, the condition may see if a field WITHDRAWN has a value greater than 0 and may check the field YEAR is not 9999. In some embodiments, a condition may reference across different database tables. For instance, the condition may state a value in a first table is needed if a value in a second table has a particular value or type. A condition may check for a user input error, a value error, or an incompatible value for a new system. A condition may be a logical condition resulting in a Boolean expression.

The condition file 120 may be generated by the data integrity tool 105. The data integrity tool 105 may generate the code according to the parameters provided through a user interface. The data integrity tool 105 will generate the instructions configured with the desired parameters, the desired parameters configured through the user interface. The condition file 120 may be stored in a plain text file. The condition file 120 may be generated once for each condition relating to the management object 115. The condition file 120 may be used to generate the evaluation code. The evaluation code may be dynamically generated based on the technical information of the management object 115 and the code in the condition file 120.

The condition code may include generated code created based on the management object file 110 and the data extract file 130. In an exemplary embodiment, a rule may appear as "HRPA_ADRGR, PA081_NO_GR_EMPTY, No empty value in field GROUP in infotype PA0801, PA0801-GROUP< >." This rule defines that the field GROUP in the table PA0801 cannot be empty. In another exemplary embodiment, a rule may appear as "*, EMPTY_MOLGA, Country code must not be empty, *-MOLGA< >." This rule defines that the field MOLGA cannot be empty for any table of any management object 115. Wild characters may be used in the grammar defining the management object 115. A condition designed to evaluate all management objects may include a character in the condition code. More specifically, the condition designed to evaluate all management objects may include a '*' character as the name value or in the name field. The "?" character may substitute a normal character, and the '*' character may represent any string. In at least one embodiment, '*' means that any number of occurrences is valued (0, . . . N) and '+' means that at least one occurrence must happen (1, . . . M). The evaluation code generated to evaluate the management object in the data extract file may include a wild character, the wild character indicating each management object of a plurality of management objects in the data extract file is to be evaluated by the condition.

Data extract file 130 may include a list of management objects, including the management object 115, and fields corresponding to the management objects. The data extract file 130 may also include a list of the set of database tables corresponding to the management object 115. The management object 115 in the data extract file 130 has a corresponding technical description in the management object file 110. The management object 115 in the data extract file 130 may have been generated based on a corresponding technical description in the management object file 110. The fields corresponding to the management object 115 in the data extract file 130 may have been generated based on content related to the management object file 110. Fields of the data extract file 130 may be determined by the content associated with the plurality of management objects. The data extract file 130 may be generated based on the management object 115 in the management object file 110.

The data extract file 130 is configured to be read line by line by the data integrity tool 105. The data integrity tool 105 may read the data extract file 130 one line at a time to evaluate whether the content corresponding to the management object 115 does not meet a condition. Each management object 115 in the data extract file 130 includes at least one field and a value. The data integrity tool 105 reads the information from the management object file 110 and the condition file 120 to dynamically generate the evaluation code that is executed during the evaluation of content related to the management object 115. For each management object 115 in the data extract file 130, the evaluation code may be dynamically generated, based on the management object file 110 and condition file 120, to determine whether the content associated with the management object 115 meets a condition.

The data extract file 130 may be generated by the data integrity tool 105. The data integrity tool 105 may extract a management object 115 from the management object file 110 as instructed through a user interface. The data integrity tool 105 may extract data associated with a management object 115 as instructed through a user interface. This extracted data may be used to populate the fields of the data extract file 130 corresponding to the management object 115.

Network 140 may be any wired and/or wireless network, including, for example, a public land mobile network, a local area network, a wide area network, a virtual local area network, the Internet, and/or the like.

The database management tool 150 is a tool for managing the data records in a cloud or network. The database management tool 150 may be configured to transfer, to the data integrity tool 105, at least a portion of the data stored at the database 160. The data integrity tool 105 (and/or another entity) may request to transfer a projection that includes some but not all of the attributes stored in the database 160. This projection may also be a table stored in the database 135. Additionally, the data integrity tool 105 (and/or the other entity) may request to transfer of at least the portion of the data stored at the database 160 by at least invoking a stored procedure. As used herein, a stored procedure may refer to a subroutine stored at the database 160, for example, in a data dictionary associated with the database 160. The stored procedure may thus be invoked by at least sending, to the database management tool 150, a statement such as, for example, a call statement and/or the like.

The database 160 may store data in one or more tables. The rows of a table may correspond to individual records and/or tuples whereas the columns of the table may correspond to the attributes associated with each record and/or tuple. The database 160 may be any type of database, including, for example, a graph database, an in-memory database, a relational database, and/or the like. The content associated with the management object 115 may include information stored in corresponding sets of database tables.

The data integrity tool 105 may generate a summary report 170, including the management object 115. The summary report 170 indicates whether the management object 115 meets a condition. The summary report 170 identifies content associated with a management object 115 that fails to meet the condition. The content failing to meet the condition may be an entry in the summary report 170. The summary report may highlight the entry. The summary report 170 may also provide a detailed view of any additional conditions that the management object 115 fails to meet. The summary report 170 is configured to be presented to a user. The summary report 170 may be referred to as a memorandum. For each of the management objects in the summary report 170, the summary report 170 details the conditions checked. The summary report 170 highlights any content associated with a management object 115 that did not match a condition.

The summary report may identify management objects with few records. For instance, if a management object has fewer records than a threshold, then a field corresponding to the management object 115 is marked with an X, the field indicating that there are few records. The summary report may identify the number of years into the future that the record will be valid. For instance, all records with the year between the current year and the current year plus the number indicated in the field may be classified as "records in the future." Any management object containing such records will have a corresponding field marked with an X. The summary report may be published in any language according to a value entered into a corresponding field. The summary report 170 may present an "X" or a "–" in a corresponding column if content related to the management object 115 includes fewer than the number of records expected. The summary report 170 may present an "X" or a "–" if the content related to the management object 115 fails to meet a condition.

Figure 2:
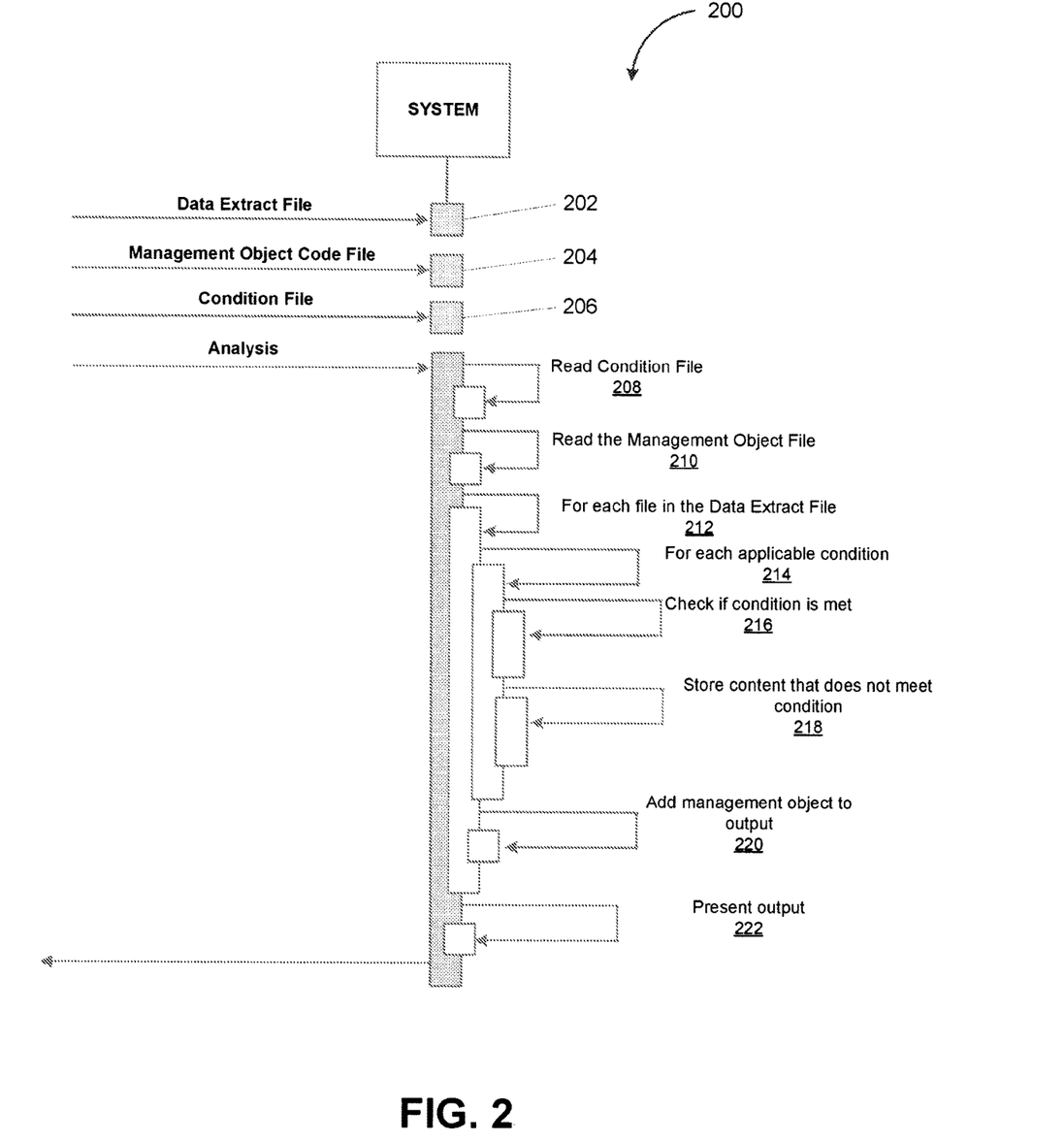
FIG. 2 depicts a flow process for generating a summary report of the analyzed management object and the associated content that fails to meet a condition, in accordance with some example embodiments.

FIG. 2 depicts a flow process for generating a summary report of the analyzed management object and the associated content that fails to meet a condition, in accordance with some example embodiments. The summary report generation flow process 200 may be supervised or carried out by the data integrity tool 105. At step 202, the data integrity tool 105 may receive a folder from which to load or access the data extract file 130. The data integrity tool 105 may load or access the data extract file 130. At step 204, the data integrity tool 105 may receive a file from which to load or access the management object file 110. The data integrity tool 105 may load or access the management object file 110. At step 206, the data integrity tool 105 may receive a folder from which to load or access the condition file 120. The data integrity tool 105 may load or access the condition file 120.

The data integrity tool 105 may then perform an analysis. At step 208, the data integrity tool 105 reads the condition file 120. Reading the condition code from the condition file 120 may include defining the relevant rules. At step 210, the data integrity tool 105 reads the management object file 110. Reading the management object code may include determining the metadata, the set of database tables, and the content associated with the management object 115. At step 212, a file is loaded from the data extract folder. The data extract folder includes a data extract file 130. The data extract file 130 includes a data line, the data line including a management object 115 to be evaluated using a condition from the condition file 120. At step 214, the data integrity tool 105 reads a data line in the data extract file 130 that includes an applicable condition. The data integrity tool 105 determines the conditions from the condition file 120 that are to evaluate the corresponding management object 115 in the data line. The data integrity tool 105 will perform a condition check for each of the relevant conditions from the condition file 120.

At step 216, the data integrity tool 105 evaluates if the content associated with the management object 115 meets or fails the condition. At step 220, the data integrity tool 105 identifies the management object 115 if the condition is not met. The data integrity tool 105 may identify the data record, the database table, or the content corresponding to the management object 115 when the condition is not met. At step 218, the data integrity tool 105 may store or record data if the condition is not met. The data integrity tool 105 may highlight a data record in the summary report 170 if the condition is not met. The data integrity tool 105 repeats steps 214 and step 216 for each condition applicable to the management object. The data integrity tool 105 repeats steps 214, 216, and 218 for each data line in the data extract file. At step 220, the data integrity tool 105 may add the management object 115 to an output. The data integrity tool 105 repeats steps 212, 214, 216, 218, and 220 for each file in the data extract folder. At step 222, the data integrity tool 105 presents the output to a user.

FIG. 3 depicts a summary report display 300, in accordance with some example embodiments. The summary report 170 is the output of the data integrity tool 105. The summary report 170 may be presented as a document, a Word document, an Excel document or a PDF document. The summary report may include the management object 115, fields associated with the management object 115, and data associated with the management object 115. Data corresponding to a management object 115 may be highlighted if the content associated with the management object 115 failed to meet a condition.

The summary report 170 indicates whether the management object 115 meets a condition. The summary report 170 identifies content associated with a management object 115 that fails to meet the condition. The content failing to meet the condition may be an entry in the summary report 170. The summary report may highlight the entry. The summary report 170 may also provide a detailed view of any additional conditions that the management object 115 fails to meet. The summary report 170 is configured to be presented to a user. The summary report 170 may be referred to as a memorandum. For each of the management objects in the summary report 170, the summary report 170 details the conditions checked. The summary report 170 highlights any content associated with a management object 115 that did not match a condition.

Figure 4:
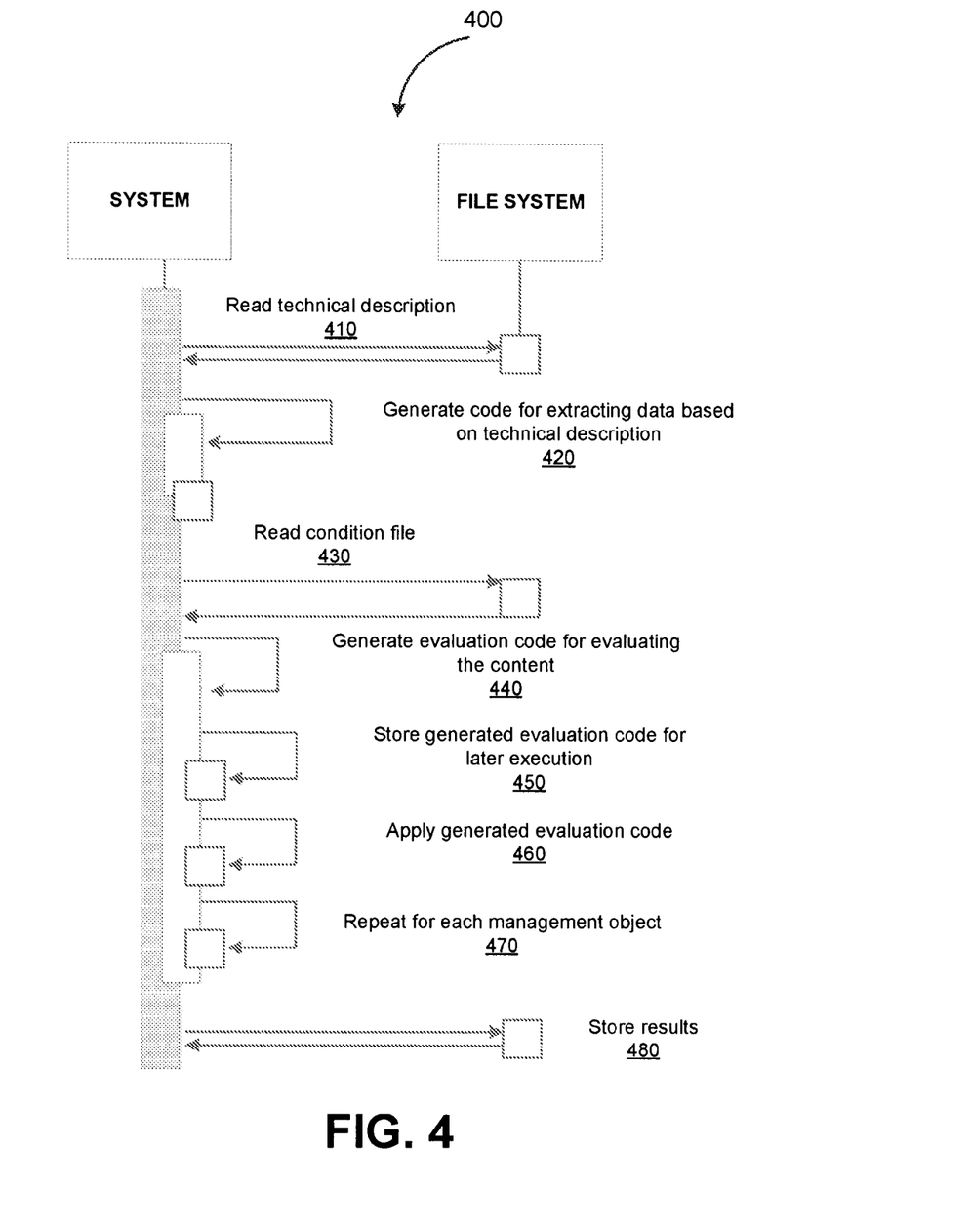
FIG. 4 depicts a flow process for generating object/rule statements for evaluating the content associated with the management object, in accordance with some example embodiments.

FIG. 4 depicts a flow process for generating object/rule statements for evaluating the content associated with the management object, in accordance with some example embodiments. The object/rule statement flow process 400 may be supervised or carried out by the data integrity tool 105. The data integrity tool 105 is configured to generate code to evaluate the content related to the management object 115. At step 410, the data integrity tool 105 reads a technical description of a management object 115. At step 420, the data integrity tool 105 creates code for extracting data associated with the management object 115 based on the technical description of the management object 115. At step 430, the data integrity tool 105 reads the condition file 120. At step 440, the data integrity tool 105 generates code for evaluating the content associated with the management object 115 based on the code from the condition file 120 and the technical description of the management object 115. At step 450, the data integrity tool 105 stores the generated evaluation code for later execution. Steps 440 and 450 are repeated until each condition related to the management object 115 is generated and stored. At step 460, the generated evaluation code is applied to the content associated with the management object 115. At step 470, the data integrity tool 105 repeats the process for each management object 115 stored in the data extract file 130. At step 480, the results of the generated evaluation code are stored and may be presented to a user.

Figure 5:
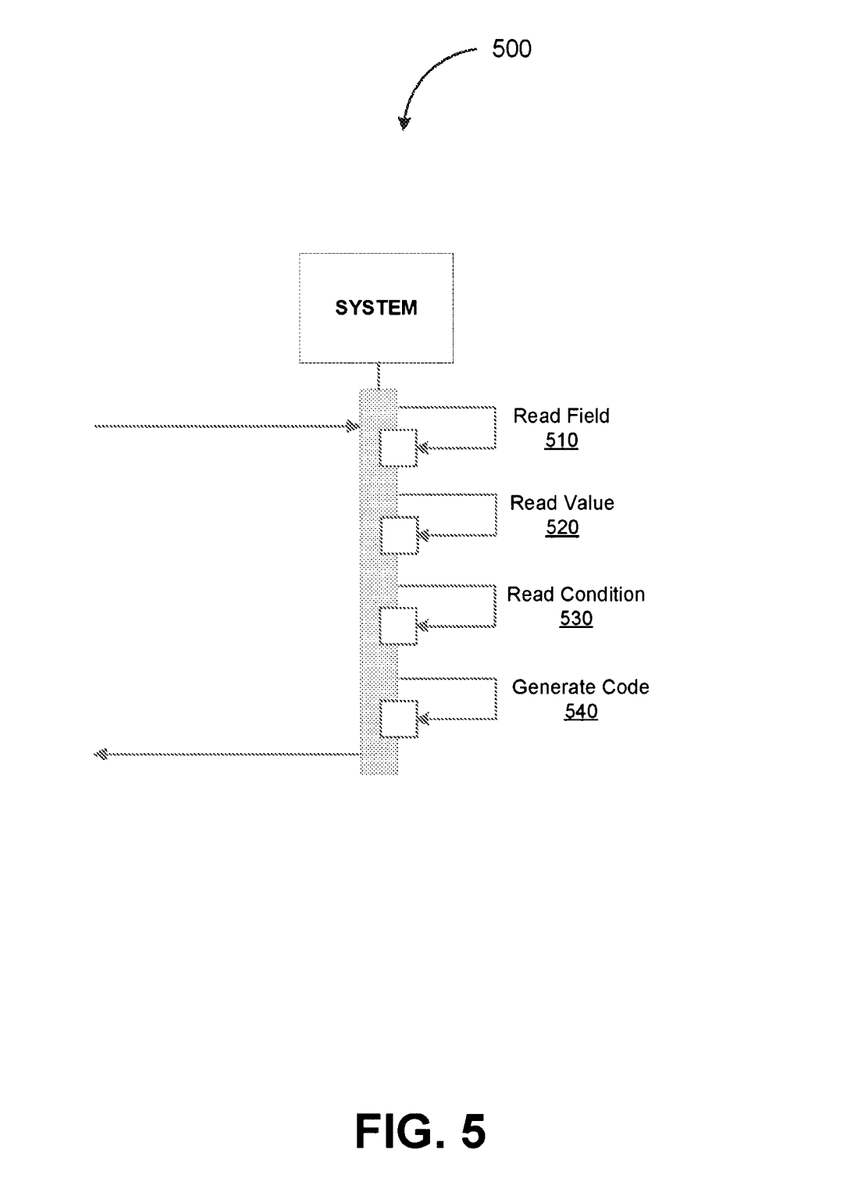
FIG. 5 depicts a flow process for generating condition code to be used for generating evaluation code, in accordance with some example embodiments.

FIG. 5 depicts a flow process for generating condition code to be used for generating evaluation code, in accordance with some example embodiments. The condition code generation flow process 500 may be supervised or carried out by the data integrity tool 105. The data integrity tool 105 is configured to generate code for each condition applicable to the content associated with the management object 115. The generated evaluation code is based on the code statements in the condition file 120. At step 510, the data integrity tool 105 reads a field associated with the management object 115 in the data extract file 130. At step 520, the data integrity tool 105 reads the value relevant to the field associated with the management object 115 in the data extract file 130. At step 530, the data integrity tool 105 reads a condition relevant to the field and value associated with the management object 115 in the data extract file 130. At step 540, the data integrity tool 105 generates evaluation code applicable to the content associated with the management object 115 based on the field, value, and condition. The evaluation code generated to evaluate the management object 115 in the data extract file 130 may be based on the field, value, and condition.

In an example embodiment, the generated code may check if a field is empty. In another embodiment, the generated code may check to see whether a payment is compatible with a payroll period date, using the field "Pay Period" and "Pay Year" and its corresponding values to create the condition.

Figure 6:
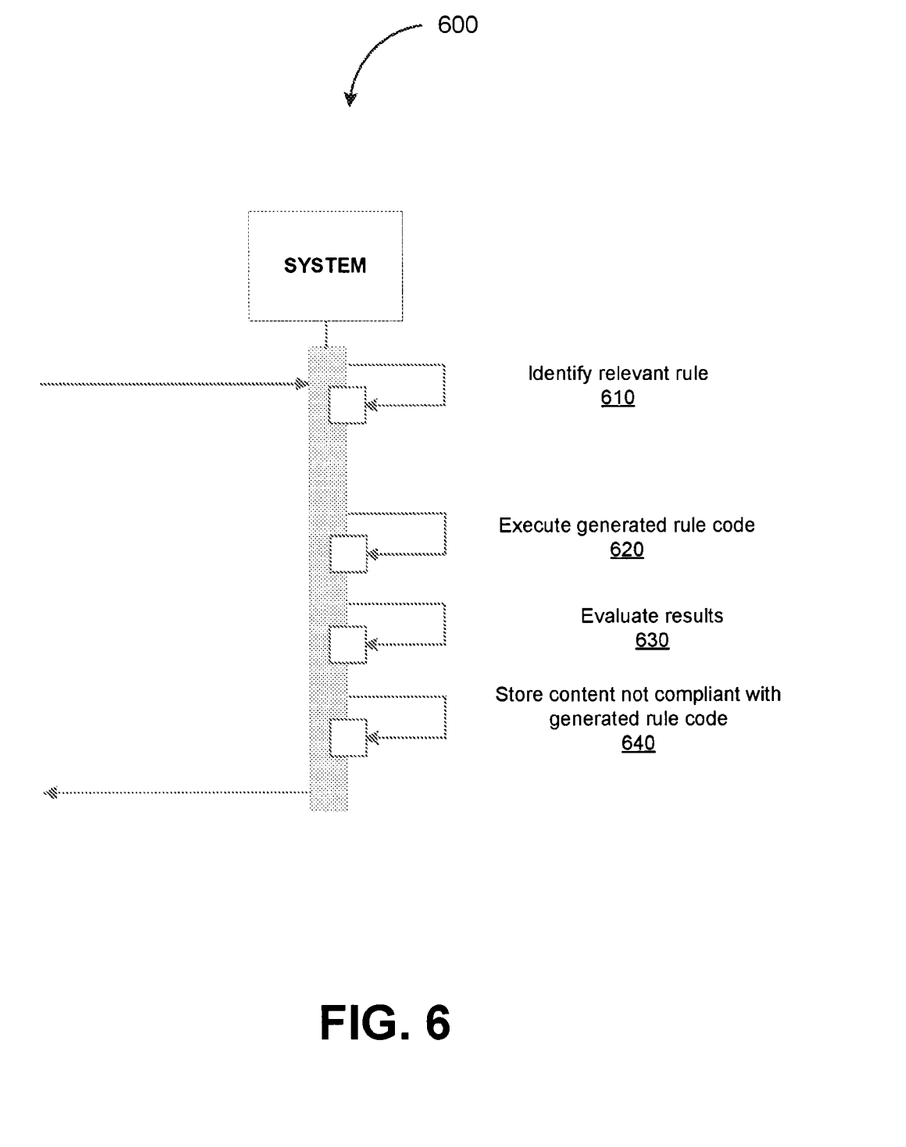
FIG. 6 depicts a flow process for applying the object/rule statement to the content associated with the management object, in accordance with some example embodiments.

FIG. 6 depicts a flow process for applying the object/rule statement to the content associated with the management object, in accordance with some example embodiments. The application flow process 600 may be supervised or carried out by the data integrity tool 105. The data integrity tool 105 is configured to apply the generated evaluation code to the content associated with the management object 115. At step 610, the data integrity tool 105 identifies the relevant rules for the management object 115. At step 620, the data integrity tool 105 executes the generated evaluation code applicable to the content associated with the management object 115. This step is repeated for each relevant rule of the management object 115. At step 630, the data integrity tool evaluates the results of the generated evaluation code applicable to the content associated with the management object 115. At step 640, the data integrity tool 105 identifies and stores content associated with the management object 115 that is not compliant with the rule. In at least one embodiment, the data integrity tool 105 marks an entry in the data extract file 130, the entry representative of content associated with the management object 115. Steps 620, 630, and 640 are repeated for each relevant rule to be applied to the management object 115. Steps 610, 620, 630, and 640 are repeated for each management object 115.

Figure 7:
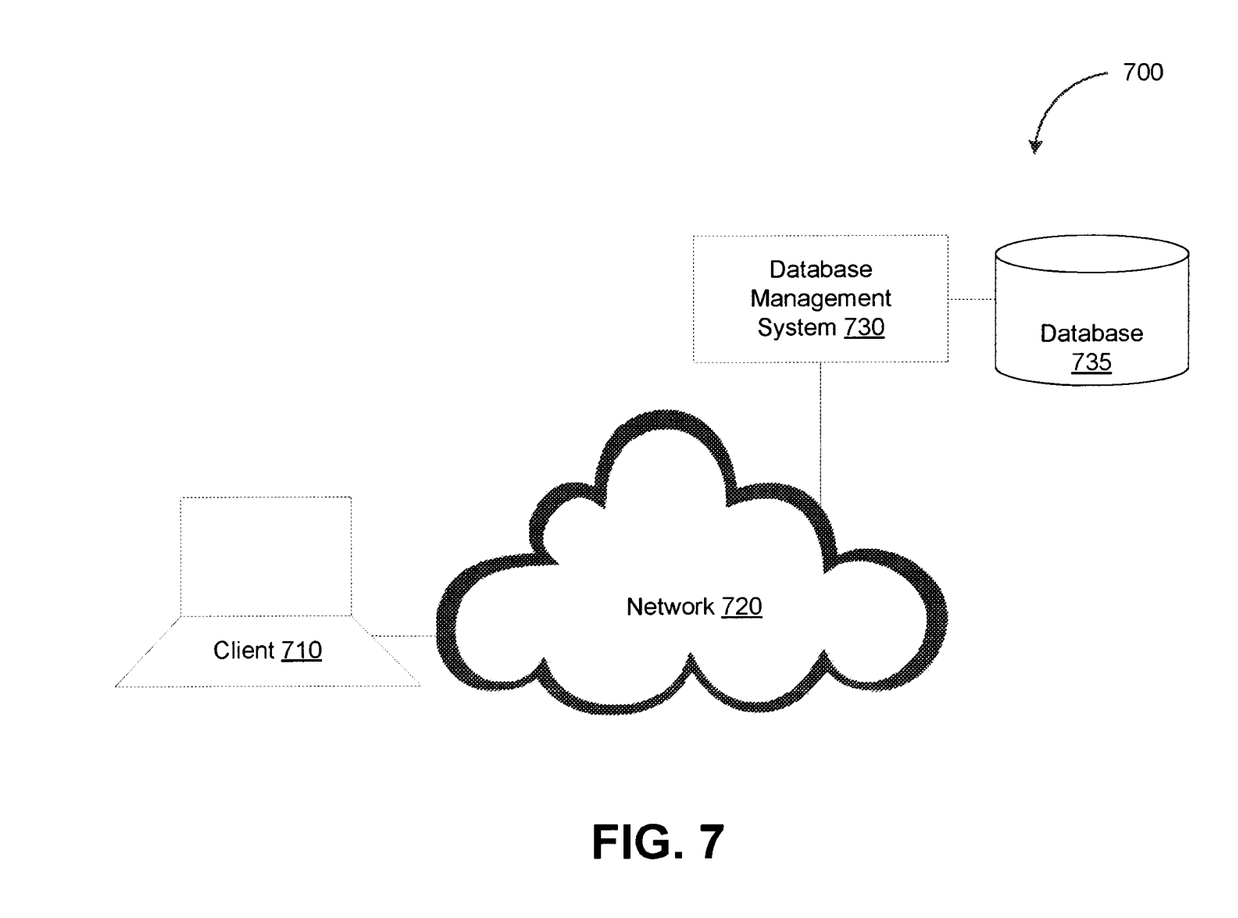
FIG. 7 depicts a block diagram illustrating a generic database, in accordance with some example embodiments.

FIG. 7 depicts a block diagram illustrating a generic database, in accordance with some example embodiments. The database system 700 may include a client 710 that is communicatively coupled, via a network 720, with a database management system 730. It should be appreciated that the client 710 may be any type of endpoint including, for example, a database and/or a database management system coupled with a database. Furthermore, the client 710 may be any processor and memory-based device including, for example, a cellular phone, smartphone, a tablet, a laptop computer, a desktop, a workstation, a server, and/or the like. Meanwhile, the network 720 may be any wired and/or wireless network including, for example, a public land mobile network (PLMN), a local area network (LAN), a wide area network (WAN), a virtual local area network (VLAN), the Internet, and/or the like.

Referring again to FIG. 7, the database management system 730 may be coupled with a database 735, which may be any type of database including, for example, a graph database, an in-memory database, a relational database, and/or the like. In some example embodiments, the database management system 730 may be configured to transfer, to the client 710, at least a portion of the data stored at the database 735. For example, the database 735 may store data in one or more tables. The rows of a table may correspond to individual records and/or tuples whereas the columns of the table may correspond to the attributes associated with each record and/or tuple. Accordingly, the client 710 (and/or another entity) may request to transfer a projection that includes some but not all of the attributes stored in the database 735. This projection may also be a table that includes some but not all of the columns from the tables stored in the database 735. Alternatively and/or additionally, the client 710 (and/or the other entity) may request to transfer at least the portion of the data stored at the database 735 by at least invoking a stored procedure. As used herein, a stored procedure may refer to a subroutine stored at the database 735, for example, in a data dictionary associated with the database 135.

In some example embodiments, the request from the client 710 may specify one or more parameters for transferring at least the portion of the data stored at the database 735. For example, the request from the client 710 may indicate whether and/or how the data being transferred from the database 735 to the client 710 should be compressed. Alternatively and/or additionally, the client 710 may also specify whether the data should be transferred in a synchronized mode or in an unsynchronized mode. Transferring the data in a synchronized mode may include sending, to the endpoint, a data chunk from each column in the internal table, including data chunks that are only partially full, in order to ensure that the endpoint is able to form at least one complete row of data upon receiving a certain quantity of data chunks. By contrast, transferring the data in an unsynchronized mode may include sending, to the endpoint, full data chunks regardless of the order in which the columns from the internal table arrive at the endpoint. As noted, transferring data in an unsynchronized mode may incur less overhead than transferring data in a synchronized mode.

Figure 8:
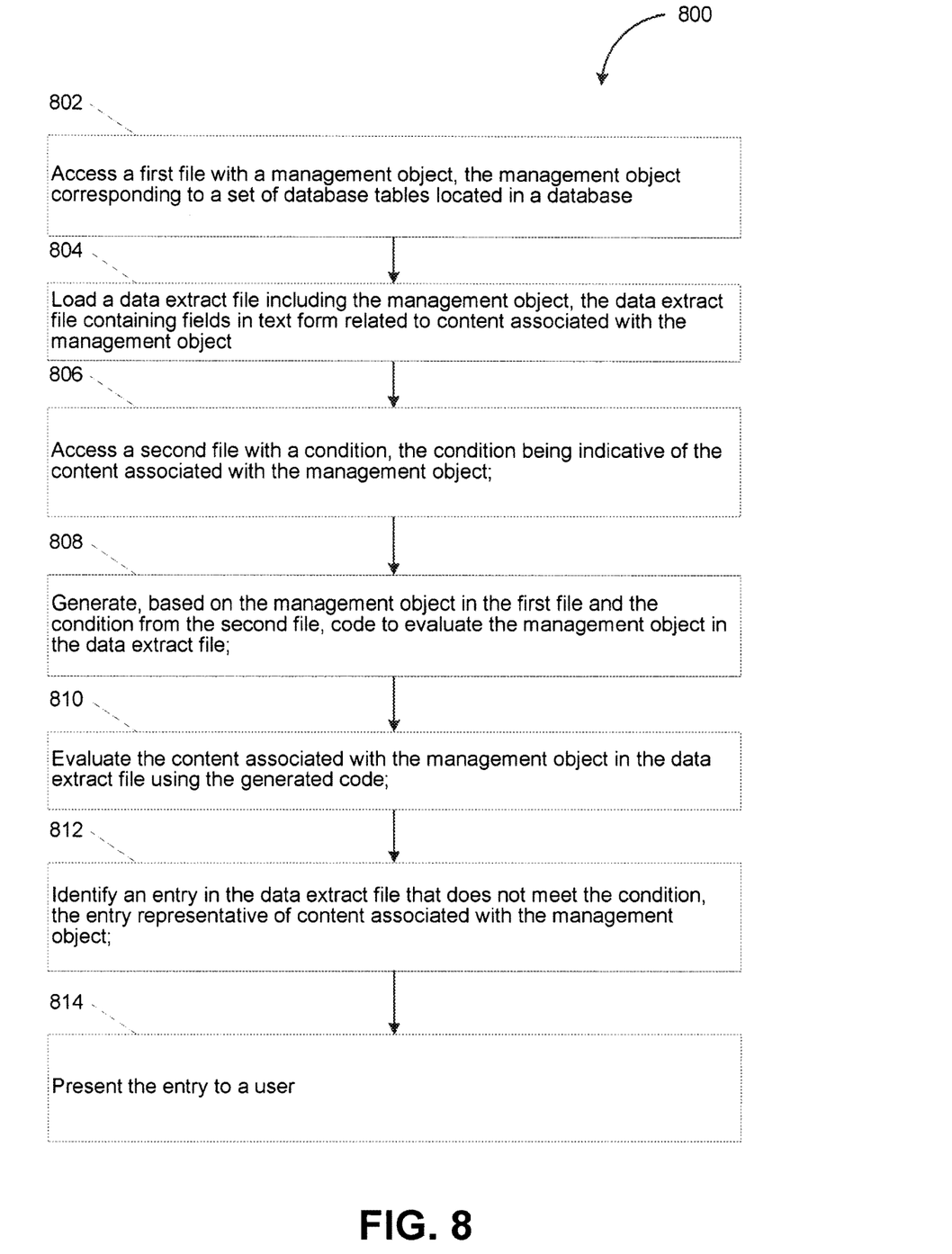
FIG. 8 depicts a flowchart illustrating a process for verifying data integrity in a database, in accordance with some example embodiments.

FIG. 8 depicts a flowchart illustrating a process for verifying data integrity in a database, in accordance with some example embodiments. The data integrity flowchart process 800 may be supervised or carried out by the data integrity tool 105. At 802, the process accesses a first file with a management object, the management object corresponding to a set of database tables located in a database. At 804, the process loads a data extract file including the management object, the data extract file containing fields in text form related to content associated with the management object. At 806, the process accesses a second file with a condition, the condition being indicative of the content associated with the management object. At 808, the process generates, based on the management object in the first file and the condition from the second file, code to evaluate the management object in the data extract file. At 810, the process evaluates the content associated with the management object in the data extract file using the generated code. At 812, the process identifies an entry in the data extract file that does not meet the condition, the entry representative of content associated with the management object. At 814, the process presents the entry to a user.

Figure 9:
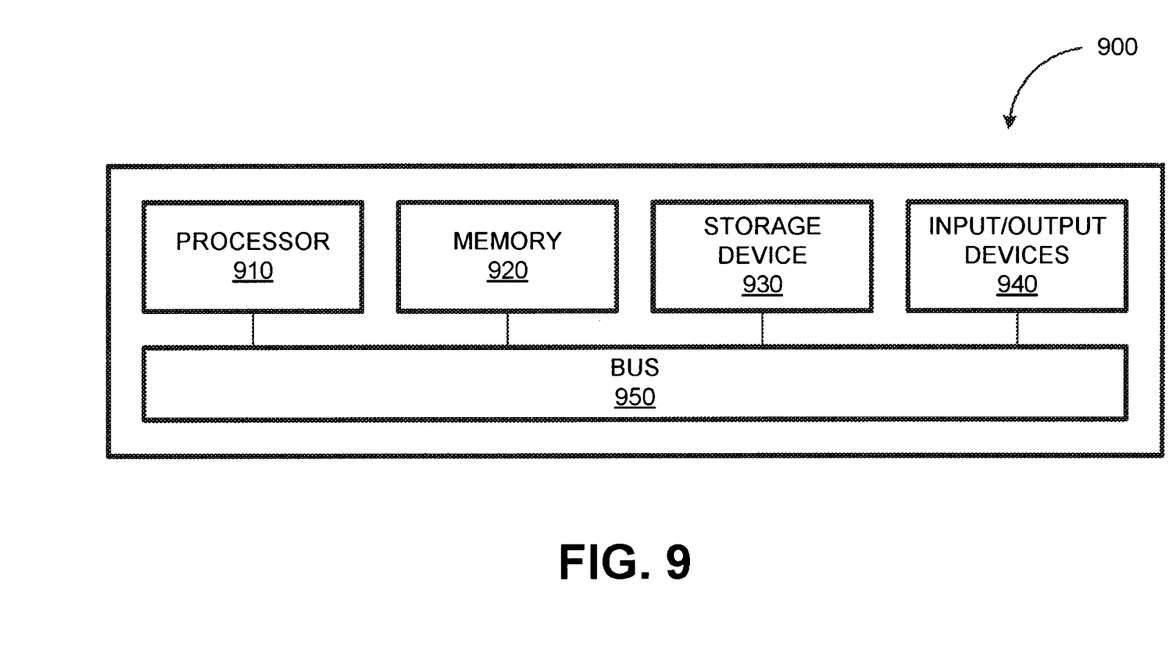
FIG. 9 depicts a block diagram illustrating a computing system, in accordance with some example embodiments.

FIG. 9 depicts a block diagram illustrating a computing system, in accordance with some example embodiments. Referring to FIGS. 1 and 7, the computing system 900 can be used to implement the data integrity tool 105 and/or any components therein.

As shown in FIG. 9, the computing system 900 can include a processor 910, a memory 920, a storage device 930, and input/output devices 940. The processor 910, the memory 920, the storage device 930, and the input/output devices 940 can be interconnected via a system bus 950. The processor 910 is capable of processing instructions for execution within the computing system 900. Such executed instructions can implement one or more components of, for example, the data integrity tool 105. In some example embodiments, the processor 910 can be a single-threaded processor. Alternatively and/or additionally, the processor 910 may be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, a tape device, a solid state drive, and/or other suitable persistent storage means. The input/output device 940 provides input/output operations for the computing system 900. In some example embodiments, the input/output device 940 includes a keyboard and/or pointing device. In various implementations, the input/output device 940 includes a display unit for displaying graphical user interfaces.

According to some example embodiments, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some example embodiments, the computing system 900 can be used to execute various interactive computer software applications that can be used for organization, analysis and/or storage of data in various formats. Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

In the following description, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

What is claimed is:

1. A system comprising:
   at least one data processor; and
   at least one memory storing instructions which, when executed by the at least one data processor, result in operations comprising:
   accessing, using a management object file of a data integrity tool, a management object, the management object corresponding to a set of database tables located in a database, and the management object file providing a technical description of the management object, wherein the technical description includes a name of the management object and an address of the set of database tables;
   loading, from the database, content accessed from the management object into a data extract file of the data integrity tool to provide a local store of the management object, the data extract file containing fields in text form related to the content associated with the management object;
   accessing a condition file of the data integrity tool, the condition file including a data line in the data extract file and a condition for evaluating the content associated with the management object, wherein the data line identifies where in the data extract file the condition is to be used to evaluate the fields in text form related to the content associated with the management object;
   generating, based on the technical description of the management object obtained from the management object file and the condition obtained from the condition file, code to evaluate, at the data extract file, the content that is associated with the management object;
   using the generated code, evaluating, at the data extract file, the content that is associated with the management object;
   in response to the evaluating using the generated code, identifying an entry in the data extract file that does not meet the condition, the entry representative of the content associated with the management object; and
   presenting the entry to a user.

2. The system of claim 1, wherein the condition comprises a check for a user input error and/or a check for an incompatible value.

3. The system of claim 1, wherein the content associated with the management object includes information stored in corresponding sets of database tables.

4. The system of claim 1, wherein the condition is a logical condition resulting in a Boolean expression.

5. The system of claim 1, wherein the fields of the data extract file are determined by the content associated with the management object.

6. The system of claim 1, wherein the generated code to evaluate the management object in the data extract file further comprises using a wild character, the wild character indicating an additional management object in the data extract file is to be evaluated by the condition.

7. The system of claim 1, wherein the management object file is a plain text file and the data extract file is a plain text file.

8. The system of claim 1, wherein the entry is presented in one of an excel file, a word file, a pdf, and a plain text file.

9. The system of claim 1, further comprising:
   generating the data extract file based on the management object in the management object file.

10. The system of claim 1, further comprising:
    populating the fields of the data extract file using the set of database tables corresponding to the management object of the data extract file.

11. The system of claim 1, wherein the generating code to evaluate the management object in the data extract file further comprises using, to generate the code, the fields, the condition, and a value associated with the management object.

12. The system of claim 1, further comprising:
    generating summary report comprising the entry; and
    highlighting a record that does not meet the condition.

13. A method comprising:
    accessing, using a management object file of a data integrity tool, a management object, the management object corresponding to a set of database tables located in a database, and the management object file providing a technical description of the management object, wherein the technical description includes a name of the management object and an address of the set of database tables;
    loading, from the database, content accessed from the management object into a data extract file of the data integrity tool to provide a local store of the management object, the data extract file containing fields in text form related to the content associated with the management object;
    accessing a condition file of the data integrity tool, the condition file including a data line in the data extract file and a condition for evaluating the content associated with the management object, wherein the data line identifies where in the data extract file the condition is to be used to evaluate the fields in text form related to the content associated with the management object;
    generating, based on the technical description of the management object obtained from the management object file and the condition obtained from the condition file, code to evaluate, at the data extract file, the content that is associated with the management object;
    using the generated code, evaluating, at the data extract file, the content that is associated with the management object;
    in response to the evaluating using the generated code, identifying an entry in the data extract file that does not meet the condition, the entry representative of the content associated with the management object; and
    presenting the entry to a user.

14. The method of claim 13, wherein the condition comprises a check for a user input error and/or a check for an incompatible value.

15. The method of claim 13, wherein the content of the management object includes information stored in corresponding sets of database tables.

16. A non-transitory computer-readable medium comprising instructions which, when executed by at least one processor, cause operations comprising:

accessing, using a management object file of a data integrity tool, a management object, the management object corresponding to a set of database tables located in a database, and the management object file providing a technical description of the management object, wherein the technical description includes a name of the management object and an address of the set of database tables;

loading, from the database, content accessed from the management object into a data extract file of the data integrity tool to provide a local store of the management object, the data extract file containing fields in text form related to the content associated with the management object;

accessing a condition file of the data integrity tool, the condition file including a data line in the data extract file and a condition for evaluating the content associated with the management object, wherein the data line identifies where in the data extract file the condition is to be used to evaluate the fields in text form related to the content associated with the management object;

generating, based on the technical description of the management object obtained from the management object file and the condition obtained from the condition file, code to evaluate, at the data extract file, the content that is associated with the management object;

using the generated code, evaluating, at the data extract file, the content that is associated with the management object;

in response to the evaluating using the generated code, identifying an entry in the data extract file that does not meet the condition, the entry representative of the content associated with the management object; and presenting the entry to a user.

\* \* \* \* \*